(12) United States Patent
Li et al.

(10) Patent No.: US 8,355,729 B2
(45) Date of Patent: Jan. 15, 2013

(54) METHOD FOR CHANGING ROUTE IN WIRELESS COMMUNICATION

(75) Inventors: Hui Li, Beijing (CN); Ping Li, Shanghai (CN); Lan Wang, Beijing (CN); Yi Sheng Xue, Beijing (CN); Wolfgang Zirwas, München (DE)

(73) Assignee: Nokia Siemens Networks Oy, Espoo (FI)

( * ) Notice: Subject to any disclaimer, the term of this patent is extended or adjusted under 35 U.S.C. 154(b) by 697 days.

(21) Appl. No.: 12/449,248

(22) PCT Filed: Jan. 30, 2008

(86) PCT No.: PCT/EP2008/051140
§ 371 (c)(1),
(2), (4) Date: Dec. 18, 2009

(87) PCT Pub. No.: WO2008/092904
PCT Pub. Date: Aug. 7, 2008

(65) Prior Publication Data
US 2010/0099415 A1    Apr. 22, 2010

(30) Foreign Application Priority Data
Jan. 30, 2007    (CN) .......................... 2007 1 0063173

(51) Int. Cl.
*H04W 40/00*    (2009.01)
(52) U.S. Cl. ..................... 455/445; 455/436; 455/452.1; 370/328; 370/331
(58) Field of Classification Search .......... 455/436–445, 455/450–453; 370/328–332, 338
See application file for complete search history.

(56) References Cited

U.S. PATENT DOCUMENTS

2005/0118993 A1    6/2005  Roux et al.
2008/0225789 A1*   9/2008  Kim et al. ..................... 370/329

FOREIGN PATENT DOCUMENTS
WO    2006/134562    12/2006

OTHER PUBLICATIONS

Shen Gang et al: "Handover Schemes in IEEE802.16j" May 8, 2006. http://www.ieee802.org/16/relay/contrib/C80216j-06_005r1.pdf (retrieved on Dec. 14, 2007).

(Continued)

*Primary Examiner* — Marcos Torres
(74) *Attorney, Agent, or Firm* — Staas & Halsey LLP (57) ABSTRACT

A method for changing a route in wireless communication involves: when there is subscriber equipment requesting a change of route in a cell, a base station negotiates downlink measurement contents with a relay station facilitating the route change in the cell; a network side informs the subscriber equipment requesting a change of route of the negotiated downlink measurement contents, and the subscriber equipment executes a downlink measurement according to the received measurement contents and reports the downlink measurement results to a radio access point; and the radio access point executes the route change for said subscriber equipment according to the received measurement results. The method can effectively improve the accuracy of the route change and alleviate the delay due to the route change.

27 Claims, 6 Drawing Sheets

OTHER PUBLICATIONS

Kevin Baum et al: "Transparent Uplink Relaying for OFDMA" IEEE 802.16 Broadband Wireless Access Working Group Nov. 4, 2004. http://www.ieee802.org/16/tge/contrib/ (retrieved on Feb. 13, 2007).

Asa et al.: "Recommendations for the Scope and Purpose of the Mobile Multihop Relay Task Group" IEEE 802.16 Mobile Multihop Relay Study Group, Nov. 11, 2005 Chapter 2 and 5.1. http://wireless-man.org/sg/mmr/contrib/C80216mmr-05_032.pdf> (retrieved on Apr. 17, 2008).

LAN/MAN Standards Committee: IEEE Std 802.16e-2005 Chapter 6.3.22.2: HO Process; Dec. 7, 2005. http://ieeexplore.ieee.org/ie15/10676/33683/01603394.pdf?tp=&isnumber=33683&arnumber=1603394> (retrieved on Apr. 17, 2008).

* cited by examiner

METHOD FOR CHANGING ROUTE IN WIRELESS COMMUNICATION

CROSS REFERENCE TO RELATED APPLICATIONS

This application is based on and hereby claims priority to PCT Application No. PCT/EP2008/051140 filed on Jan. 30, 2008 and CN Application No. 200710063173.8 filed on Jan. 30, 2007, the contents of which are hereby incorporated by reference.

BACKGROUND OF THE INVENTION

The present invention relates to a route technology in wireless communication, and particularly to a method for changing a route in wireless communication.

Figure 1:
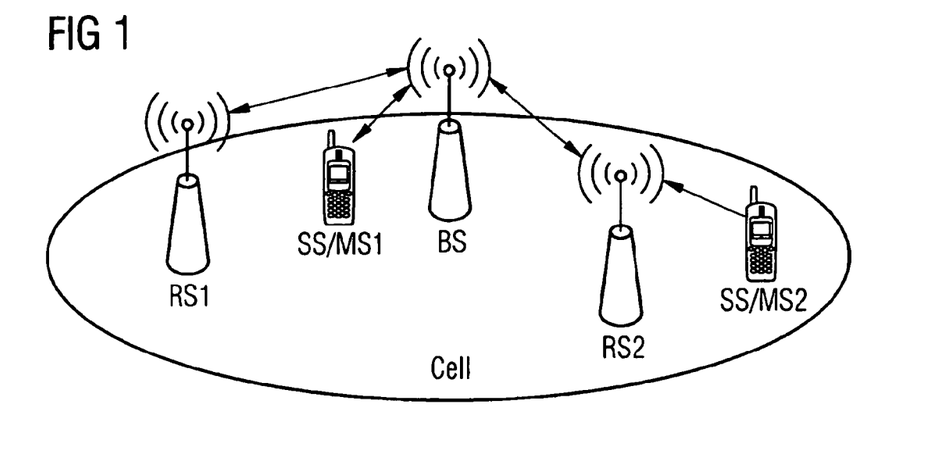
FIG. 1 is a structural diagram of a multi-hop cell based on the operation controlled by a BS.

With the continuous developments in wireless communication technology and the increasing requirements by wireless communication users, cellular communication systems may change from the conventional single-hop form to a multi-hop form. For example, the Institute for Electrical and Electronic Engineers (IEEE) recently proposed the introduction of relay stations (RS) into the cellular systems on account of IEEE 802.16, so as to construct a multi-hop cell structure with a cell coverage jointly provided by a base station (BS) and the surrounding multi-hop RSs thereof. FIG. 1 shows a structure diagram based on a multi-hop cell controlled by a BS. In FIG. 1, each RS as well as the BS acts as a radio access point (RAP) to serve the subscriber stations (SS)/mobile stations (MS). An SS/MS close to the BS, such as MS1, accesses the BS directly in a single-hop manner; while an SS/MS far away from the BS, such as MS2, accesses the BS in a multi-hop manner via one or more RS. It can be seen that the introduction of the RS not only broadens the area of cell coverage and extends the capacity of cell coverage but also reduces the transmit power of the SS/MS side, so as to provide high-quality wireless communication at lower costs.

In a multi-hop communication system, when the change in the position of an SS/MS or wireless signal and so on happens, the network side may need to adjust the SS/MS route, namely to perform a route change, so as to ensure a stable network service for the SS/MS. Usually, the route change comprises two types: an intracell route change and an intercell handover and so on. Of these, the intracell route change means that an SS/MS changes the RAP providing it with service within the same cell; and the intercell handover means that the SS/MS changes the RAP between different cells.

Currently some researchers propose that, during the change of a route, the BS and the RS relevant to the SS/MS requiring the route change execute an uplink measurement and gather the measurement results at the BS, and then the BS determines an intracell route change or an intercell handover for the relevant SS/MS according to the uplink measurement results.

The current methods for the route change on the basis of uplink measurements presuppose that the uplink conditions are the same as the downlink conditions, therefore the measurement results of the uplink are used to reflect the uplink and downlink. However, in practical applications, when the uplink conditions differ from those of the downlink and the uplink and the downlink are separate, the uplink measurement results cannot reflect the downlink conditions, and then the BS will use the inaccurate measurement results as a basis for changing the route, which will cause the SS/MS to be switched to an unsuitable route and lead to poor accuracy in route changing. In addition, since the timing of the action in which an SS/MS transmits information to a BS or RS through an uplink may be interrupted, when there is no information sent from SS/MS over the uplink, a BS or RS cannot execute the uplink measurement, thereby making it impossible to carry out a timely route change for an SS/MS.

SUMMARY

The inventors propose a method for changing a route, which involves the following steps:

A. when there is subscriber equipment requesting a change of route in a cell, a BS negotiates downlink measurement contents with a relay station facilitating the route change in the cell;

B. a network side informs the subscriber equipment requesting a change of route of the negotiated downlink measurement contents, and the subscriber equipment executes a downlink measurement according to the received measurement contents and reports the downlink measurement results to an RAP; and C. the RAP executes the route change for the subscriber equipment according to the received measurement results.

Depending on the differences between network models, the RAP in the abovementioned steps can be a BS, or one or more RS facilitating the route change. In practical applications, an entity for realizing an RAP can be configured automatically by the network using the proposed route change solution.

In this method, in step A the downlink measurement contents negotiated by the BS with the RS facilitating the route change in the cell comprise the following steps:

A1. the BS combines itself and/or the RS facilitating the route change into a set of RAP facilitating the route change;

A2. the BS transmits the downlink measurement contents to be negotiated to the RS in the set of RAP facilitating the route change, and the RS determines acceptable measurement contents according to its status and informs the BS; and A3. it is judged whether or not the BS and the RS have reached an agreement on all the downlink measurement contents; if so, the negotiation procedure is completed; otherwise, the measurement contents for which an agreement is reached are used as the downlink measurement contents to be negotiated, and execution returns to the step A2.

Preferably, before the subscriber equipment executes the downlink measurement according to the received measurement contents in step B, it also comprises the following step: the BS and/or the RS facilitating the route change transmit(s) a predetermined guidance signal to the subscriber equipment over the downlink.

Preferably, before the step B it also comprises the following step: the BS negotiates a resource allocation scheme with the RS facilitating the route change; and before the BS and/or the RS facilitating the route change transmit(s) the predetermined guidance signal to the subscriber equipment over the downlink, it also comprises the following step: the BS and the RS facilitating the route change take up wireless resources according to the negotiated resource allocation scheme.

In this method, the process for the subscriber equipment to execute the downlink measurement according to the received measurement contents in step B can comprise the following step:

the subscriber equipment receives the guidance signal over the downlink according to a frequency band and a time slot specified in the measurement contents, and executes the downlink measurement according to the guidance signal, so as to acquire the downlink measurement results including a signal to interference plus noise ratio (SINR).

Preferably, before the transmission of the predetermined guidance signal to the subscriber equipment over the downlink, it also comprises the following step:

the BS negotiates the guidance signal used in this downlink measurement with the RS facilitating the route change, and uses the guidance signal determined by negotiation as the predetermined guidance signal.

Preferably, before the subscriber equipment executes the downlink measurement according to the received measurement contents in the step B, it also comprises the following step:

the BS and/or the RS facilitating the route change transmit(s) a data sequence over the downlink.

Preferably, before the step B, it also comprises the following step: the BS negotiates a resource allocation scheme with the RS facilitating the route change; and before the BS and/or the RS facilitating the route change transmit(s) the data sequence over the downlink, it also comprises the following step: the BS and the RS facilitating the route change take up wireless resources according to the negotiated resource allocation scheme.

In this method, the process of the downlink measurement executed by the subscriber equipment according to the received measurement contents in the step B can comprise the following step:

the subscriber equipment receives the data sequence over the downlink according to a frequency band and a time slot specified in the measurement contents, and executes the downlink measurement according to the data sequence, so as to acquire the downlink measurement results including a radio frequency signal intensity.

In this method, the process in step C in which the RAP executes the route change for the subscriber equipment according to the received downlink measurement results can comprise:

judging whether or not an RAP meeting the communication requirements of the subscriber equipment requesting a change of route exists in the cell according to the received measurement results; if so, an intracell route change for the subscriber equipment requesting a change of route is executed by changing the wireless resources used by the subscriber equipment, and an RAP meeting the communication requirements is selected to serve the subscriber equipment, and this route change procedure is completed; otherwise, an intercell handover is executed for the subscriber equipment requesting a change of route, and this route change procedure is completed.

In this method, the process for the RAP to execute the route change for the subscriber equipment according to the received downlink measurement results in step C can comprise:

determining whether or not an RAP meeting the communication requirements of the subscriber equipment requesting a change of route exists in the cell according to the received measurement results; if so, an intracell route change for the subscriber equipment requesting a change of route is executed by changing the attribution of the wireless resources currently used by the subscriber equipment, and the radio access point meeting the communication requirements is selected to serve the subscriber equipment, and this route change procedure is completed; otherwise, an intercell handover is executed for the subscriber equipment requesting a change of route, and the route change procedure is completed.

Preferably, before the downlink measurements executed by the subscriber equipment according to the received measurement contents in step B, it also comprises the following step:

the BS negotiates a simulation scheme with the RS facilitating the route change, and according to the negotiated simulation scheme the RS simulates the BS by periodically using the downlink to transmit a preamble sequence, a frame control header and a physical-layer mapping information frame in the simulation scheme.

In this method, the simulation process of the BS comprises: simulation of one BS by each relay station in the set of RAP facilitating the route change, or simulation of one BS by two or more RS together.

In this method, the process for the subscriber equipment to execute a downlink measurement according to the received measurement contents in step B can proceed as follows:

the subscriber equipment receives the preamble sequence, frame control header and physical-layer mapping information frame over the downlink according to the frequency band and time slot specified in the measurement contents, and executes the downlink measurement according to the received signal, so as to acquire the downlink measurement results including the signal to interference plus noise ratio (SINR).

Preferably, after the downlink measurement results are reported to the RAP in step B, it further comprises the following step: the RS facilitating the route change stops simulating the BS.

In this method, the process for the RAP to execute the route change for the subscriber equipment according to the received downlink measurement results in step C can comprise:

judging whether or not a simulated BS meeting the communication requirements of the subscriber equipment requesting a change of route exists in the cell according to the received measurement results; if so, the intracell route change is executed by allocating the wireless resources of the simulated BS meeting the communication requirements to the subscriber equipment, and this route change procedure is completed; otherwise, the intercell handover for the subscriber equipment requesting a change of route is executed, and the route change procedure is completed.

In this method, step B, in which the negotiated downlink measurement content is communicated to the subscriber equipment requesting a change of route, can comprise: carrying the downlink measurement contents in a route change request message, and transmitting same to the subscriber equipment; and step B, in which the downlink measurement results are reported to the RAP, can comprise: carrying the downlink measurement results in a route change response message, and transmitting same to the RAP.

In this method, the step of carrying the downlink measurement contents in the route change request message and transmitting same to the subscriber equipment can comprise: transmitting a report-request (REP-REQ) command carrying the downlink measurement contents to the subscriber equipment; and the step of carrying the downlink measurement results in the route change response message and transmitting same to the RAP can comprise: transmitting a report-respond (REP-RSP) command carrying the downlink measurement results to the RAP.

In this method, the step of carrying the downlink measurement contents in the route change request message and transmitting same to the subscriber equipment can comprise: allocating a channel quality information channel (CQICH) for carrying channel quality information to the subscriber equipment requesting a change of route, and transmitting the downlink measurement contents to the subscriber equipment by carrying an information element defined by the CQICH; and the step of carrying the downlink measurement results in the route change response message and transmitting same to the RAP can comprise: transmitting the downlink measurement results to the RAP over the CQICH.

In this method, the step of carrying the downlink measurement contents in the route change request message and transmitting same to the subscriber equipment can comprise: transmitting a base station handover request MOB_BSHO-REQ command carrying the downlink measurement contents to the subscriber equipment;

the step of carrying the downlink measurement results in the route change response message and transmitting same to the RAP can comprise: transmitting a handover indication MOB_HO-IND command carrying the downlink measurement results to the RAP.

Preferably, before the step C it also comprises: execution of an uplink measurement on the subscriber equipment by the RAP; and before executing the route change on the subscriber equipment in step C, it also comprises: combination of the uplink measurement results and downlink measurement results by the RAP.

In this method, the RAP can be a BS or one or more RS facilitating the route change.

In this method, the process of forming the set of RAP facilitating the route change in step A1 can comprise: determination of the elements in the set of RAP by the BS by using a network topology structure and information regarding the current routing of the subscriber equipment requesting a change of route.

Preferably, before determining the elements in the set of RAP or the step of executing the route change, it also comprises: excluding from the set of RAP any RAP that has wireless resources not meeting the communication requirements of the subscriber equipment.

The accuracy of the route change can be improved by implementing the proposed method. Specifically, the proposed method has the following potential beneficial effects:

before executing a route change, a downlink measurement is executed by an SS/MS requiring the route change, and then the RAP determines the way to change the route according to the downlink measurement results. Since asymmetrical services are in dominant positions in the current and future wireless networks, and in most cases the requirements for a downlink are much more critical than those for an uplink, a route change executed according to the downlink conditions therefore has a higher accuracy.

Moreover, before executing the downlink measurement, an RAP transmits a signal for measurement over the downlink, and it can therefore effectively avoid failure to execute the route change in a timely manner, caused by inability to obtain the continuous uplink information, so that the delay in the route change is reduced and the timeliness thereof is improved.

Further, since the priority level of an intracell route change can be set to be higher than that of an intercell route change, and the complexity and consumed resources of an intracell route change are far less than those of an intercell route change, the method for changing the route is simple to operate, easy to implement, and it can save costs and reduce interference.

Finally, a route change request message and a route change response message needed during a route change can be mapped to the commands specified in the IEEE 802.16 protocol, namely the existing commands of the protocol can be utilized in realizing the route change. Therefore, during execution of the method, only a few changes to the original network operation are needed, and the operability is better.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The basic idea of the proposed method for changing a route is that: during a route change, first of all a BS in a cell in which an SS/MS requiring the route change is located negotiates with an RS facilitating the route change regarding measurement contents, and then the SS/MS is instructed to execute the downlink measurement, and according to the downlink measurement results the type of the route change is determined and the determined route change executed.

Figure 2:
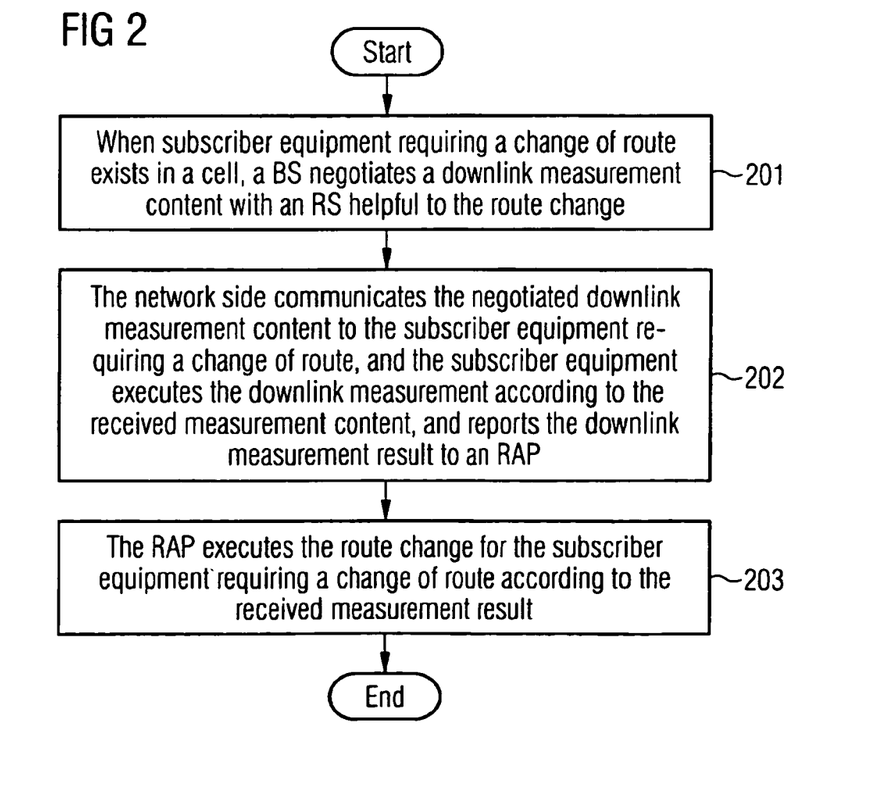
FIG. 2 is a schematic flowchart of a proposed method for changing a route.

FIG. 2 shows a schematic flowchart of a method for changing a route. Referring to FIG. 2, in step 201, when there is subscriber equipment requesting a change of route in a cell, a BS negotiates downlink measurement contents with an RS facilitating the route change in the cell; in step 202, a network side informs the subscriber equipment requesting a change of route of the negotiated downlink measurement contents, and the subscriber equipment executes a downlink measurement according to the received measurement contents and reports the downlink measurement results to an RAP; in step 203, the RAP executes the route change for the subscriber equipment according to the received measurement results.

The user equipment comprises the subscriber terminal such as SS, MS and so on; the RAP may be network-side equipment such as a BS, or one or more RS facilitating the route change. In practical applications, a network adopting the route change solution can achieve automatic configuration of the RAP by utilizing current network standards according to the network model. The route change solutions are specifically explained by way of five embodiments.

Embodiment 1

In this embodiment, a long-term and fixed wireless resources division scheme is adopted, that is to say that, within a time of superframe level, such as 10 seconds or 1 minute, orthogonal wireless resources are assigned to each RAP in the cell. For example, if the wireless resources are 2M (bandwidth)×2 ms, a first half of the wireless resources therein, namely 1M (bandwidth)×2 ms, is assigned to the BS and the second half of the wireless resources, namely 1M (bandwidth)×2 ms, are assigned to the RS in the cell, and the resources occupied by each RAP are fixed within this time slot. In addition, in order to facilitate the subscriber equipment's execution of the downlink measurement, after the BS has negotiated with the RS facilitating the route change in this embodiment it transmits a predetermined pilot signal to the subscriber equipment via the downlink.

Figure 3:
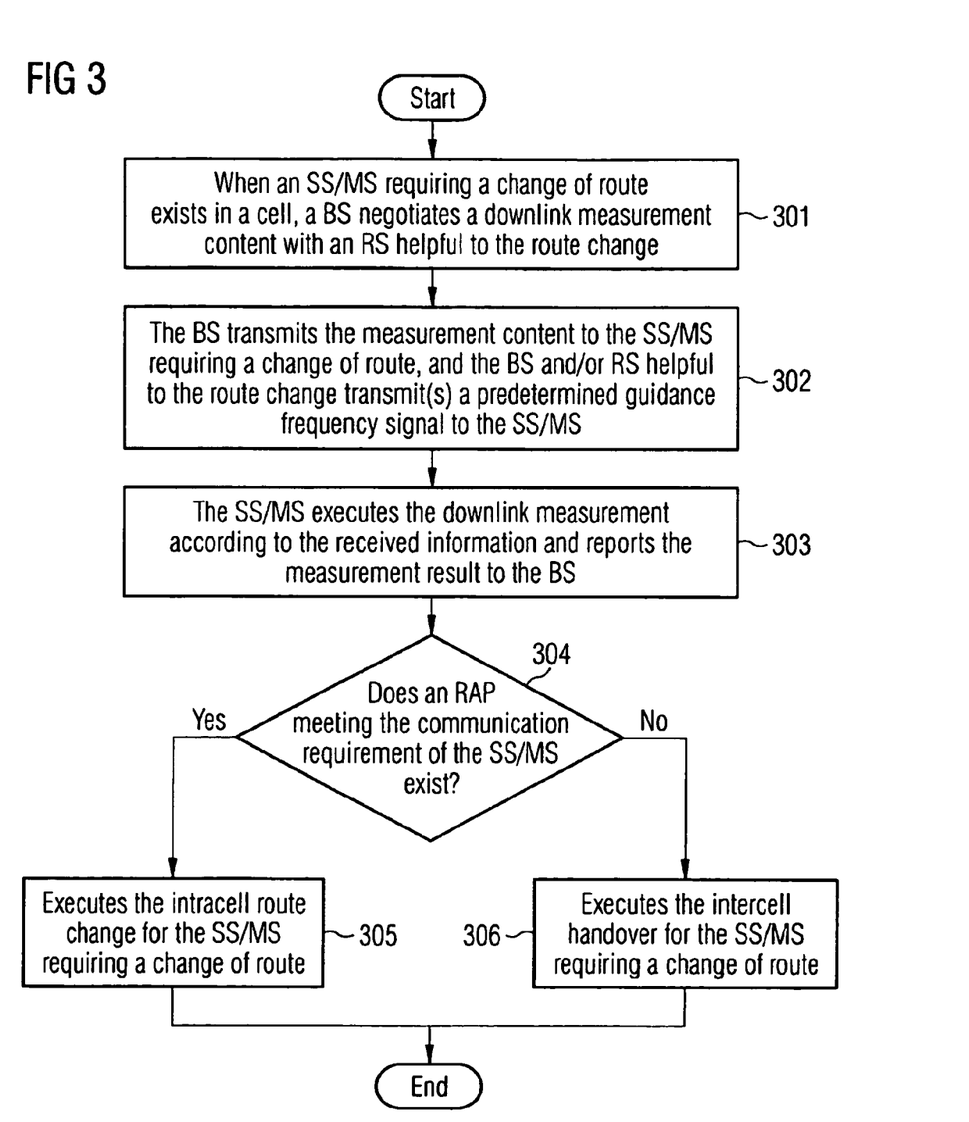
FIG. 3 is a flowchart of the proposed method for changing a route in an embodiment 1.

FIG. 3 shows a flowchart of the method for changing a route in this embodiment. Referring to FIG. 3, the method of this embodiment comprises the following:

in step 301, when the cell contains an SS/MS requesting a change of route, a BS negotiates the downlink measurement contents with an RS facilitating the route change.

Usually, the SS/MS itself, the BS or other network entity can all request the route change. Specifically, the event which can trigger a route change comprises, but is not limited to: the deterioration of radio frequency (RF) channel conditions caused by the movement of the SS/MS or the changes of surrounding environment; an event relevant to load balancing or disturbance management and so on in the cell; an event relevant to the optimization of quality of service (QoS) in the network, and so on.

When there are aforementioned events that can trigger the route change in the wireless network, the SS/MS relevant to these events needs to change the route thereof. In order to ensure a higher accuracy of the route change operation, in this step the BS utilizes a network topology structure and current routing information from the SS/MS requesting a change of route to determine a set of RAPs facilitating the route change; the set can include a BS and one or more RS which can provide useful information for changing a route, namely a possibility of providing service to the SS/MS after the route has been changed. Depending on the differences in practical situations, the RS in the set may be all the RS or some of the RS in this cell. In addition, for determination of the RAP set by the BS, the wireless resources that the RAPs have taken up can be considered as one of the factors, for example, excluding from the RAP set those RAPs which have wireless resources not meeting the bandwidth requirements by the SS/MS requiring the route change.

After determining the RAP set facilitating the route change, the BS negotiates the downlink measurement contents, for example a frequency band, a time slot and so on, relevant to the downlink measurement with the RS in the set. Specifically, the BS transmits the downlink measurement contents to the determined RS in the RAP set, and the RS determines the acceptable measurement contents according to its own condition and informs the BS; it is then determined whether or not the BS and RS have reached an agreement on all downlink measurement contents; if so, the negotiation is completed; otherwise, the BS and RS renegotiate the measurement contents on which they have not reached an agreement. It can be seen here that the indication that the negotiation has ended is that the BS and RS have reached an agreement on all the measurement contents.

In Step 302, the BS transmits the measurement contents to the SS/MS requiring the route change, and the BS and/or the RS facilitating the route change use(s) the downlink to transmit a predetermined guidance signal to the SS/MS requiring the route change according to the negotiated measurement contents.

Specifically, this embodiment has a plurality of modes for transmitting the measurement contents to the SS/MS, for example the BS generates a route change request message and sends the message directly downlink; or the BS retransmits the route change request message to the RS in direct communication with the SS/MS, and then the RS sends the measurement contents; or the BS informs the RS in direct communication with the SS/MS, and the RS generates the route change request message according to the instruction from the BS and the measurement contents are carried in the message to prompt the sending; or, the BS receives the route change request message generated in advance from the network equipment such as a Radio Network Controller (RNC), and the measurement contents negotiated with the RS are carried in the received message to prompt the sending.

In addition, in order to facilitate the downlink measurement, one group or several groups of guidance signals are set in advance in the RAP and SS/MS in this embodiment; and when there are several groups of the guidance signals, the guidance signal used in this measurement is also negotiated in step 301. Thus, the RAP in the RAP set facilitating the route change transmits the guidance signal to the SS/MS in the negotiated time slot and frequency band according to the negotiated measurement contents.

In Step 303, the SS/MS requiring the route change executes the downlink measurement according to the received information and reports the measurement results to the BS.

After the negotiated measurement contents have been received by the SS/MS requiring the route change according to the specification in the measurement contents, it receives the guidance signal transmitted from the BS and the RS in the RAP set facilitating the route change and executes the downlink measurement, so as to determine whether or not the BS and RS can serve the SS/MS, in order to determine the SS/MS's changed route in the subsequent steps. Since in this embodiment the guidance signal is known to the SS/MS, a signal to interference plus noise ratio (SINR) can be obtained by the downlink measurement, and it is also possible to use the SINR to deduce whether or not the route represented by the downlink meets the criteria, such as QoS and so on.

After the SS/MS has obtained the downlink measurement results corresponding to each RAP in the RAP set facilitating the route change, the measurement results can be reported to the BS, for example, by a route change response message. In this case the reported results may be the downlink measurement results corresponding to all RAPs in the RAP set facilitating the route change, or may be the downlink measurement results corresponding to the RAP with a better quality in the set. Moreover, when the SS/MS is relatively close to the BS, the SS/MS transmits the route change response message to the BS directly; when the SS/MS is far away from the BS, the SS/MS can transmit the route change response message to the BS via one or more RS.

In Steps 304 to 306, the BS determines whether or not an RAP meeting the communication requirements of the SS/MS requiring the route change exists in the cell according to the received measurement results. If so, an intracell route change is executed for the SS/MS requiring the route change by changing the wireless resources used by the SS/MS, and the BS itself or the RS meeting the communication requirements is selected to serve the SS/MS, and then this route change procedure is completed; otherwise, an intercell handover for the SS/MS requesting a change of route is started, and the route change procedure is completed.

After having received the downlink measurement results from the SS/MS, according to the predetermined communication requirements of the SS/MS, the BS determines whether an RAP meeting the communication requirements exists in the cell where it is located. For example, the BS determines whether or not the RS or BS corresponding to each measurement result can make the SS/MS communicate normally. In addition, if the wireless frequency resources which each RAP already has are not considered when determining the RAP set facilitating the route change, then the RAP that has wireless resources not meeting the requirement of bandwidth needed by the SS/MS requiring the route change can then be excluded from those RAPs meeting the communication requirements.

When an RAP meeting the communication requirement exists in the cell, it indicates that an intracell route change can be made for the SS/MS, and then when the route change is exectued, the RAP providing the service is changed by changing the wireless resources used by the SS/MS. For example, as in FIG. 1, MS1 requires the route change, and after the aforementioned Steps 301 to 304, it is determined that the intracell route change can be executed for MS1; according to the measurement results, MS1 is then changed from the wireless resources belonging directly to the BS to the wireless resources belonging to RS1, or RS2, or to the wireless resources in which one part belongs to RS1 and another part belongs to RS2. The case in which the service is provided to the SS/MS by RS1 and RS2 together is normally called a joint transmission technique.

On the other hand, when an RAP meeting the communication requirements does not exist in the cell, it indicates that the wireless resources cannot sustain the normal communication of the SS/MS, and then the SS/MS is switched to another cell.

At this point, the route change process is completed in this embodiment.

It can be seen from the above description that before the route change is executed in this embodiment, the downlink measurement is executed by the SS/MS requiring the route change, and then the RAP of the BS and/or the RS determines the manner of the route change according to the downlink measurement results. Since the asymmetrical service is dominant in wireless networks, the requirements for the downlink are more critical than those for the uplink. When conditions of the uplink and the downlink are different from each other and the uplink and the downlink are separated from each other, the manner of the route change determined by the downlink measurement results can improve the accuracy of the route change. Moreover, the downlink measurement in this embodiment can avoid the case in which the route change cannot be executed in a timely manner when the continuous uplink information cannot be obtained. Further, since the priority level of the intracell route change in this embodiment is higher than the priority level of the intercell route change, and the complexity and consumed resources of the intracell route change are far less than those of the intercell handover, the method for the route change in this embodiment is simple to operate and easy to realize, and moreover it saves costs and reduces the interference.

Embodiment 2

In this embodiment, a dynamic wireless resources allocation scheme is adopted in the cell. In this case, the resources assigned to each RAP in the cell are not fixed for a period of time, but vary dynamically. However, it is similar to embodiment 1 in that, in order to facilitate the subscriber equipment's execution of the downlink measurement, in this embodiment after having negotiated with the RS, the BS also transmits the predetermined guidance signal to the subscriber equipment via the downlink.

Figure 4:
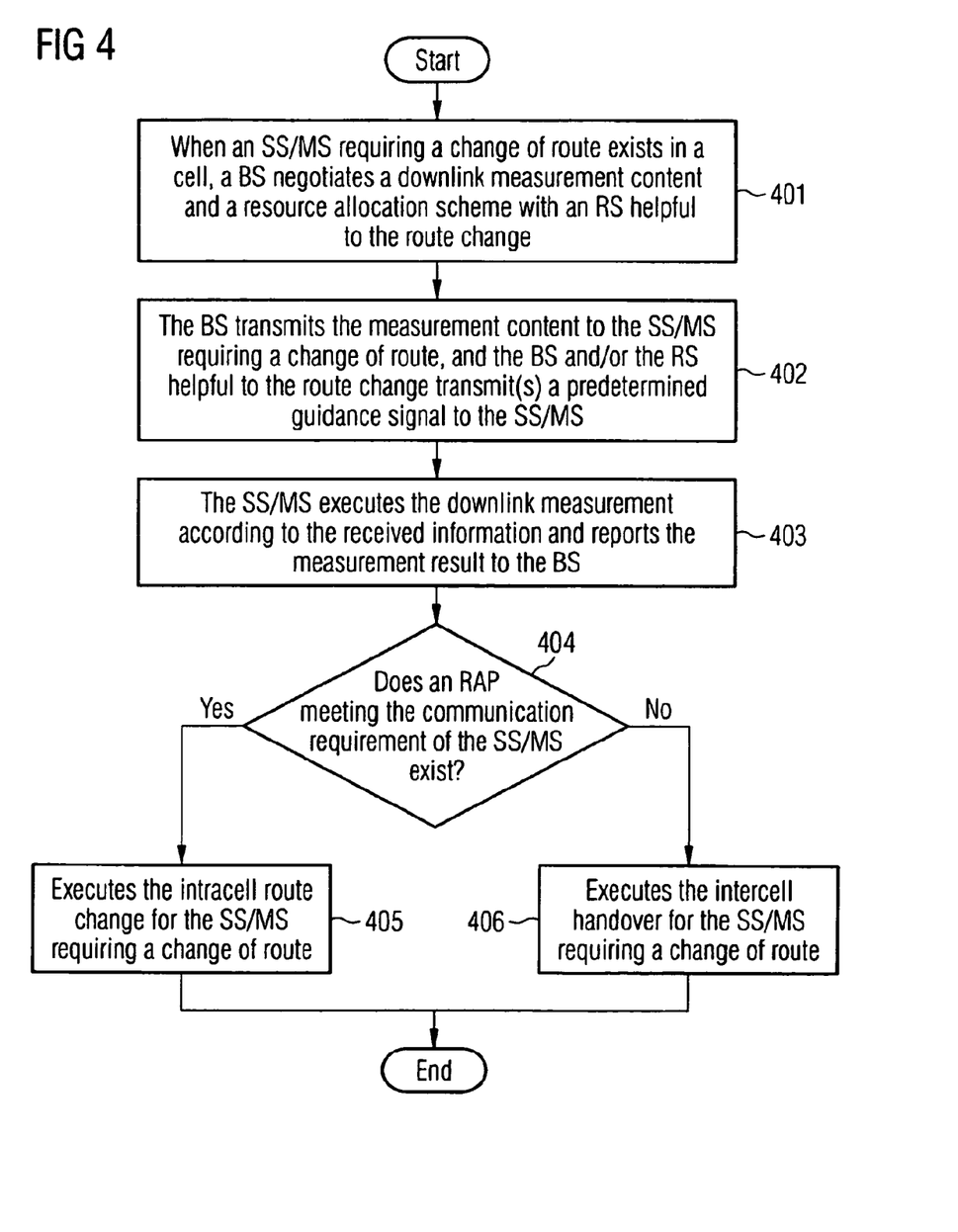
FIG. 4 is a flowchart of the proposed method for changing a route in an embodiment 2.

FIG. 4 shows a flowchart of the method for changing a route in this embodiment. Referring to FIG. 4, the method of this embodiment comprises:

in step 401, when the cell contains an SS/MS requesting the route change, a BS negotiates the downlink measurement contents and a resource allocation scheme with an RS facilitating the route change.

Since a dynamic wireless resources allocation scheme is adopted in this embodiment, at the same time when negotiating the downlink measurement contents with an RS in the RAP set facilitating the route change, the BS also negotiates the resource allocation scheme relevant to the RS in the group. For example, it is negotiated whether or not the resource in a certain frequency band is allocated to a certain RAP in a certain time slot. The negotiation is completed when the RS and BS have reached an agreement on the downlink measurement contents and the resource allocation scheme.

In Step 402, the BS transmits the measurement contents to the SS/MS requiring the route change, and the BS and/or the RS facilitating the route change transmit(s) a predetermined guidance signal to the SS/MS requiring the route change according to the negotiated measurement contents and the resource allocation scheme over the downlink.

In this step the measurement contents can be transmitted to the SS/MS in the same way as in step 302 of embodiment 1. However, what is different from embodiment 1 is that, in this case, before transmitting the guidance signal, the BS and the RS in the RAP set facilitating the route change take up the wireless resources first in the time slot determined by negotiation, and then transmit the guidance signal by using the occupied wireless resources.

In Step 403, the SS/MS requiring the route change executes the downlink measurement according to the received information and reports the measurement results to the BS.

The operation in this step is the same as the operation of Step 303 in embodiment 1.

In Steps 404 to 406, the BS determines whether or not an RAP meeting the communication requirements of the SS/MS requiring the route change exists in the cell according to the received measurement results. If so, an intracell route change is executed for the SS/MS requiring the route change by changing the ownership of the wireless resources currently used by the SS/MS, and the BS itself or the RS meeting the communication requirements is selected to serve the SS/MS, and then this route change procedure is completed; otherwise, an intercell handover for the SS/MS requesting the route change is started, and this route change procedure is completed.

In this case, when the cell contains an RAP meeting the communication requirements, it indicates that an intracell route change can be executed for the SS/MS, and then when executing the route change, the RAP providing the service is changed by changing the ownership of the wireless resources currently used by the SS/MS. In other words, the wireless resources used by the SS/MS are not changed; it is only that the wireless resources now belong to another RAP. For the SS/MS, the intracell route change in this embodiment is transparent. For example, as in FIG. 1, MS1 requires the route change, and after the aforementioned Steps 401 to 404, it is determined that the intracell route change can be executed for MS1, and then according to the measurement results the wireless resources used by MS1 are changed from directly belonging to the BS to belonging to RS1, or RS2, or so that one part of it belongs to RS1, and the other part belongs to RS2.

At this point, the route change process is completed in this embodiment.

This embodiment can also improve the accuracy and timeliness of the route change, and it saves costs and reduces the interference during the route change.

Embodiment 3

In this embodiment, the long-term and fixed wireless resources allocation scheme is adopted in a cell, that is to say, within a superframe level, such as 10 seconds or 1 minute, fixed orthogonal wireless resources are assigned to each RAP in the cell, and the resources taken up by each RS are fixed in this long period of time. In addition, in contrast to the embodiments 1 and 2; no guidance signal is predetermined in this embodiment, but before the SS/MS requiring the route change executes the downlink measurement a data sequence is transmitted by the BS and the RS facilitating the route change over the downlink.

Figure 5:
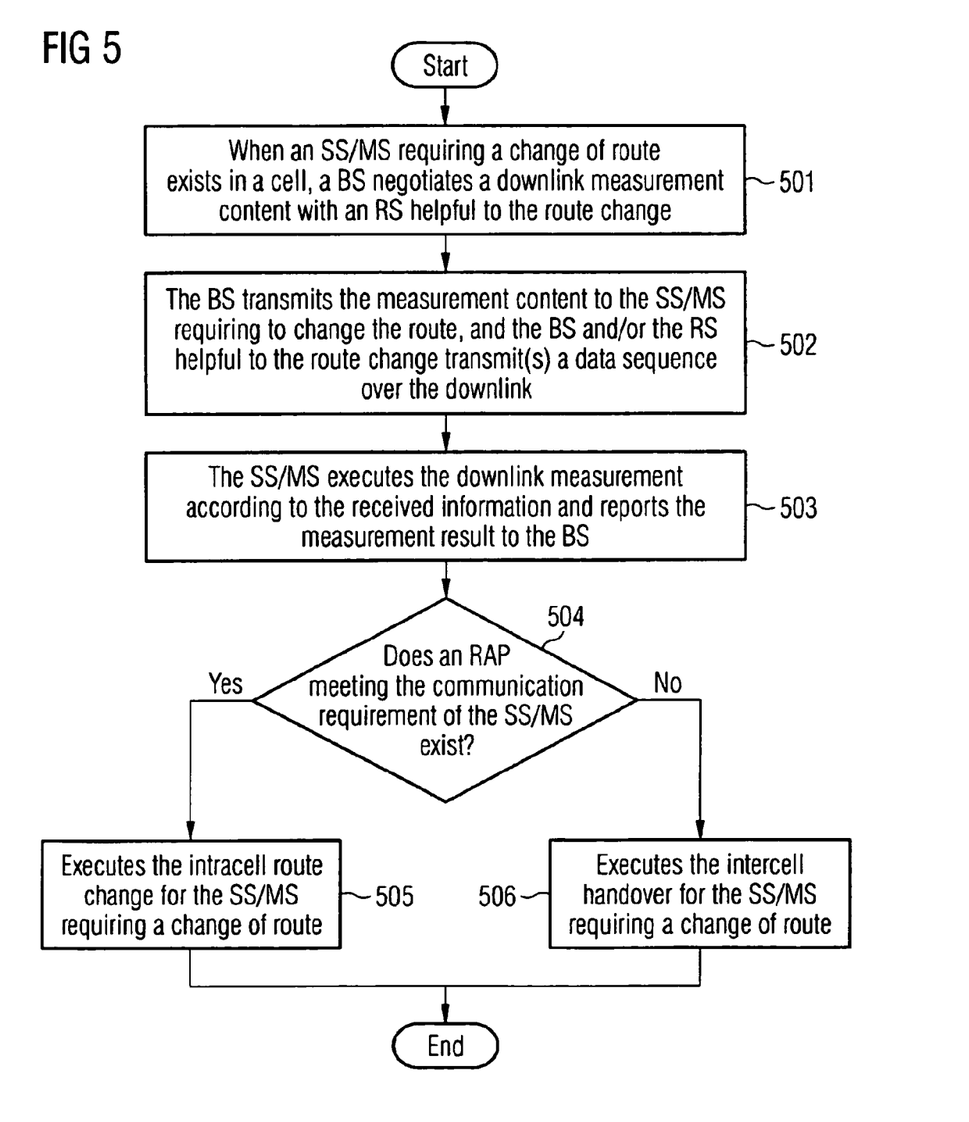
FIG. 5 is a flowchart of the proposed method for changing a route in an embodiment 3.

FIG. 5 shows a flowchart of the method for changing a route in this embodiment; referring to FIG. 5, the method of this embodiment comprises:

in step 501, when the cell contains an SS/MS requesting a change of route, a BS negotiates the downlink measurement contents with an RS facilitating the route change.

The operation in this step is the same as that of Step 301 in embodiment 1.

In Step 502, the BS transmits the measurement contents to the SS/MS requiring the route change, and the BS and the RS facilitating the route change transmit a data sequence over the downlink according to the negotiated measurement contents.

In this step, as in embodiment 1, there are several modes for transmitting the measurement contents to the SS/MS.

Before executing the downlink measurement, the BS and the RS in the RAP set facilitating the route change transmit a data sequence over the downlink according to the negotiated measurement contents in this step, for example transmitting the data sequence in the negotiated time slot and frequency band. The data sequence is unknown to the SS/MS in this case.

In Step 503, the SS/MS requiring the route change executes the downlink measurement according to the received information and reports the measurement results to the BS.

Since the data sequence in this embodiment is unknown to the SS/MS, usually the criteria such as a radio frequency (RF) signal intensity and so on can be obtained by the downlink measurement. When a more advanced blind identification mechanism is adopted, more criteria can be obtained, and also it can be deduced from these criteria whether or not the route represented by the downlink meets the criteria such as QoS and so on.

In addition, the same method as in step 303 in embodiment 1 can be adopted in this step to report the measurement results.

In Steps 504 to 506, the BS determines whether or not an RAP meeting the communication requirements of the SS/MS requiring the route change exists in the cell according to the received measurement results. If so, an intracell route change is executed for the SS/MS requiring the route change by changing the wireless resources used by the SS/MS, and the BS itself or the RS meeting the communication requirements is selected to serve the SS/MS, and then this route change procedure is completed; otherwise, an intercell handover for the SS/MS requesting a change of route is started, and the route change procedure is completed.

Here the operation of the three steps is the same as the operation of Steps 304 to 306 in embodiment 1.

At this point, the route change process is completed in this embodiment.

Embodiment 4

In this embodiment, the fixed wireless resources allocation scheme is adopted in a cell, that is to say that the resources assigned to each RAP in the cell are not fixed in a period of time, and instead they vary dynamically. Moreover, similarly to embodiment 3, no guidance signal is predetermined in this embodiment, but before the SS/MS requiring the route change executes the downlink measurement a data sequence is transmitted by the BS and RS in the RAP set facilitating the route change over the downlink.

Figure 6:
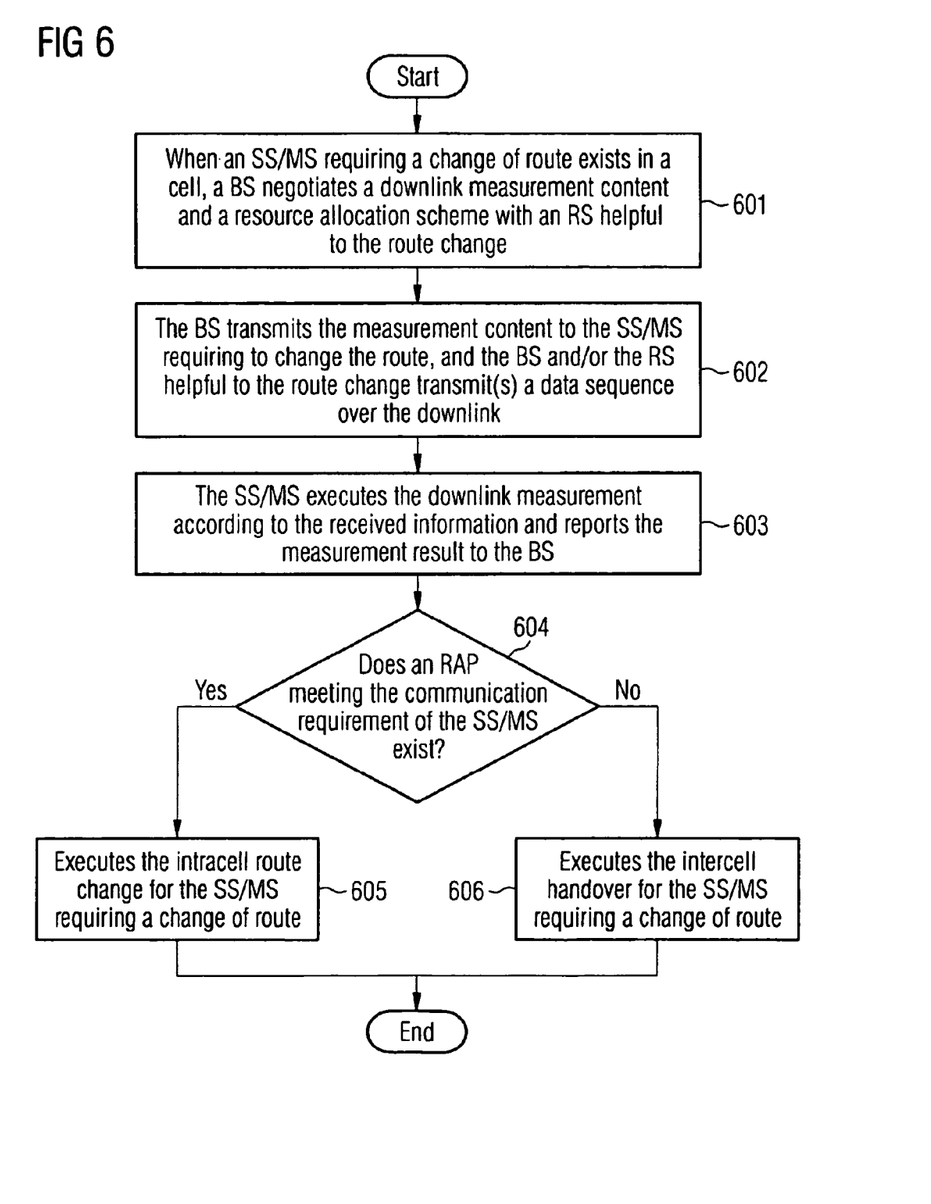
FIG. 6 is a flowchart of the proposed method for changing a route in an embodiment 4.

FIG. 6 shows a flowchart of the method for changing a route in this embodiment, and referring to FIG. 6, the method of this embodiment comprises:

in step 601, when the cell contains an SS/MS requesting a change of route, a BS negotiates the downlink measurement contents and a resource allocation scheme with an RS facilitating the route change.

The operation in this step is the same as the operation of Step 401 in embodiment 2.

In Step 602, the BS transmits the measurement contents to the SS/MS requiring the route change, and the BS and the RS facilitating the route change transmit a data sequence over the downlink according to the negotiated measurement contents and a resources allocation scheme.

In this step the measurement contents can be transmitted to the SS/MS in the same way as in step 302 of embodiment 1. However, what is different from embodiment 1 is that in this case, before transmitting the guidance signal, the BS and the RS in the RAP set facilitating the route change take up the wireless resources first in the time slot determined by negotiation and then transmit the data sequence using the occupied wireless resources.

In Step 603, the SS/MS requiring the route change executes the downlink measurement according to the received information and reports the measurement results to the BS.

The operation of this step is the same as that of Step 303 in embodiment 1.

In Steps 604 to 606, the BS determines whether or not an RAP meeting the communication requirements of the SS/MS requiring the route change exists in the cell according to the received measurement results. If so, an intracell route change is executed for the SS/MS requiring the route change by changing the ownership of the wireless resources used by the SS/MS, and the BS itself or the RS meeting the communication requirements is selected to serve the SS/MS, and then this route change procedure is completed; otherwise, an intercell handover for the SS/MS requesting the route change is executed, and the route change procedure is completed.

Here the operation of the three steps is the same as that of Steps 404 to 406 in embodiment 2.

At this point, the route change process is completed in this embodiment.

In the aforementioned four embodiments, the downlink measurement is achieved through a channel measurement mechanism in the state of non-intercell handover. In traditional cell communication systems, such a channel measurement mechanism in the state of non-intercell handover is used to support the application of a self-adoptive technique and the work of the system in an unauthorized frequency brand. The inventors propose utilizing an existing mechanism to support the route change in a multi-hop cell system. In fact, the downlink measurement can also be executed by utilizing the measurement of the intercell handover in existing protocols. A specific solution will be described in detail in embodiment 5 as below.

Embodiment 5

In this embodiment, it is assumed that under normal circumstances an RS is transparent to an SS/MS. When the SS/MS requires the route to be changed, the RS in the RAP set facilitating the route change simulates an independent BS, and at this time the RS, so to speak, is not transparent to the SS/MS. For the sake of clarity, the BS referred to below are all real BS entities, while a simulated BS means the RS which starts the simulation operation.

Figure 7:
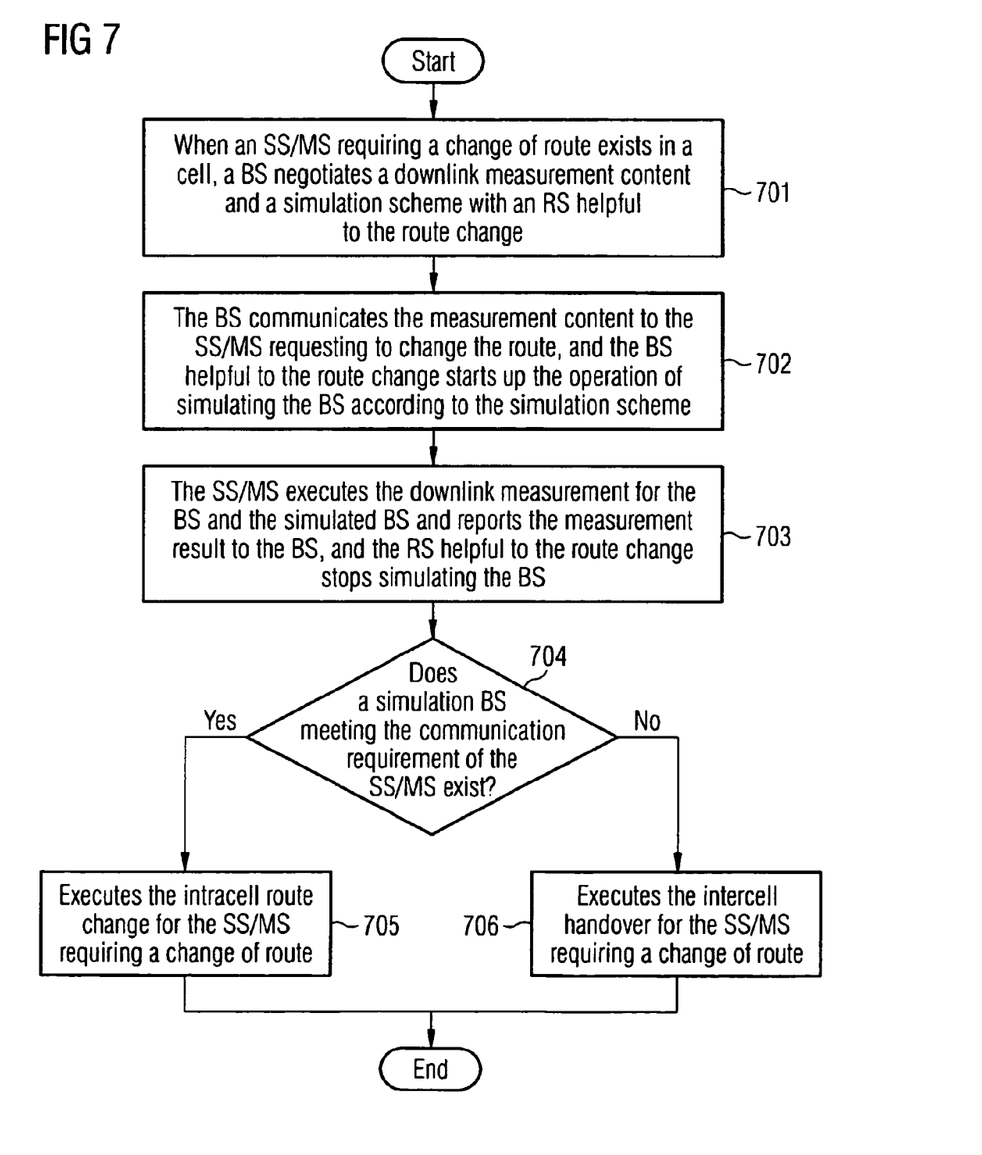
FIG. 7 is a flowchart of the proposed method for changing a route in an embodiment 5.

FIG. 7 shows a flowchart of the method for changing a route in this embodiment. Referring to FIG. 7, the method of this embodiment comprises:

in step 701, when the cell contains an SS/MS requesting a change of route, a BS negotiates the downlink measurement contents and a simulation scheme with an RS facilitating the route change.

In this embodiment the RS is transparent to the SS/MS under normal circumstances, and the BS negotiates the simulation scheme first with the RS in the RAP set facilitating the route change, so as to determine how the RS can simulate a single BS, namely to simulate the time of the BS, an assigned identification (ID), and to simulate wireless resources used during the simulation, a preamble sequence and a physical-layer signaling operation (PHY) and so on. When there are enough wireless resources in the cell, each RS in the RAP set facilitating the route change can simulate one BS; when the wireless resources are in short supply, one BS can be simulated together by two or more RS. In other words, when there are m RS in the RAP set facilitating the route change, the number of simulated BS n is less than or equal to m. When the relevant BS and RS reach an agreement, the negotiation is completed.

In Step 702, the BS communicates the measurement contents to the SS/MS requesting the route change; the RS facilitating the route change starts the operation to simulate the BS according to the negotiated simulation scheme over the downlink.

In this step, when simulating the BS, the RS facilitating the route change can periodically transmit a preamble sequence, a frame control header, a physical-layer mapping information frame and so on, which are negotiated. The RS having started the operation to simulate the BS acts as a new BS to face the SS/MS requiring the route change.

In Step 703, the SS/MS requiring the route change executes the downlink measurement for the BS and the simulated BS and reports the measurement results to the BS, and the RS facilitating the route change stops simulating the BS.

In this step, the SS/MS considers that at least two BS have appeared in front of it, and then the SS/MS acquires the downlink measurement results which can be used to determine the route change mode in the subsequent steps by measuring the relevant information from the BS which has appeared. Moreover, after the BS receives the downlink measurement results from the SS/MS, it informs the relevant RS in the RAP set facilitating the route change to stop simulating the BS, namely to stop transmitting the preamble sequence or using the assigned ID of the BS.

In Steps 704 to 706, the BS determines whether or not a simulated BS meeting the communication requirements of the SS/MS requiring the route change exists in the cell according to the received measurement results. If so, an intracell route change is executed for the SS/MS requiring the route change, and then this route change procedure is completed; otherwise, an intercell handover for the SS/MS requesting the route change is started, and the route change procedure is completed.

When the BS determines that a simulated BS meeting the communication requirements exists, the wireless resources of the simulated BS are allocated to the SS/MS requesting a change of route, so as to realize the intracell route change for the SS/MS. As viewed from the SS/MS, its route is changed, and the quality of communication is improved.

In addition, the same as for the aforementioned embodiments 1 and 4, when there is no simulated BS meeting the communication requirements, it indicates that the wireless resources in the cell cannot sustain the normal communication of the SS/MS, and then the SS/MS is switched to another cell.

At this point, the route change process is completed in this embodiment.

In the aforementioned five embodiments, the sending of the measurement contents and the reporting of the measurement results can be realized in the manner specified in the IEEE 802.16 protocol, namely to make the route change request message and the route change response message specified.

Specifically, as for embodiments 1 to 4, in one way, the route change request message is realized by adopting the medium access control layer signaling report-request (REP-REQ) command, and the route change response message is realized by adopting the report-response (REP-RSP) command; in another way, the BS assigns the channel quality information channel (CQICH) for carrying the channel quality information to the SS/MS, and the route change message is generated by loading the downlink measurement contents in the information element carrying the definition of the CQICH, and then the SS/MS reports the measurement results to the BS via the assigned CQICH; at this time, the information on CQICH can be considered to be the route change response message. As for embodiment 5, the route change request message can be mapped as the base station handoff request (MOB_BSHO-REQ), and the route change request message can be mapped as the handoff indication (MOB_HO-IND) command.

In the aforementioned five embodiments, only the examples in which the downlink conditions are taken as a basis for the route change are given. During the practical applications, the uplink measurement results can also be added to the basis for the route change. In this case, before determining whether or not an RAP meeting the communication requirements exists, the BS or the RS in the RAP set facilitating the route change executes the uplink measurement for the SS/MS requiring the route change. And then the acquired uplink measurement results are combined with the downlink measurement results, and it is judged whether a proper RAP exists according to the predetermined communication requirement criteria; if so, an intracell route change is executed; otherwise an intercell handover is executed.

When the uplink measurement is combined with the downlink measurement to execute the route change, the RAP can obtain the real state of the uplink and downlink more precisely, thereby further improving the accuracy of the route change. Especially if the uplink differs from the downlink, and the uplink and the downlink are separated, the improvement of the accuracy is more significant.

In addition, although only the examples of receiving the link measurement results and determining the manner of route change by the BS are given above, it is also possible to receive the link measurement results and determine the manner of route change by an RS facilitating the route change in the embodiments.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method of changing a route in a wireless communication system having subscriber equipment and network side equipment, the network side equipment comprising a base station, the method comprising:
    negotiating downlink measurement contents with a relay station facilitating a change of route in a cell when there is subscriber equipment requesting the route change in the cell, the downlink measurement contents being negotiated at the base station;
    informing the subscriber equipment requesting the route change of the negotiated downlink measurement contents, the subscriber equipment being informed from the network side equipment;
    executing a downlink measurement corresponding to each radio access point facilitating the route change according to the received downlink measurement contents and reporting downlink measurement results to a selected radio access point, at the subscriber equipment; and
    executing the route change for the subscriber equipment according to the received measurement results at the selected radio access point having received the downlink measurement results.

2. The method according to claim 1, wherein the negotiating the downlink measurement contents by the base station with the relay station facilitating the route change in the cell comprising:
    combining the base station and/or the relay station facilitating the route change into a set of radio access points facilitating the route change;
    transmitting the downlink measurement contents to be negotiated to the relay station from the base station through the set of radio access points facilitating the route change, and determining acceptable measurement contents according to the status of the relay station and informing the base station, at the relay station;
    determining whether the base station and said relay station have reached an agreement on all the downlink measurement contents;
    terminating the negotiation procedure when the base station and the relay station have reached an agreement on all the downlink measurement contents; and
    using the measurement contents for which an agreement is reached as the downlink measurement contents to be negotiated when the base station and the relay station have not reached an agreement on all the downlink measurement contents and then transmitting the downlink measurement contents to the relay station from the base station and determining and informing the base station of acceptable measurement contents, at the relay station.

3. The method according to claim 1, further comprising transmitting a predetermined guidance signal to the subscriber equipment over the downlink from the base station and/or the relay station facilitating the route change before the subscriber equipment executes the downlink measurement according to the received measurement contents.

4. The method according to claim 3, further comprising:
    negotiating a resource allocation scheme with the relay station facilitating the route change before informing the subscriber equipment of the negotiated downlink measurement contents at the network side equipment; and
    using wireless resources according to the negotiated resource allocation scheme at the base station and/or the relay station facilitating the route change before the base station and/or the relay station facilitating the route change transmits the predetermined guidance signal to the subscriber equipment over the downlink.

5. The method according to claim 3, wherein the executing the downlink measurement according to the received measurement contents at the subscriber equipment comprising:
    receiving the guidance signal over the downlink according to a frequency band and a time slot specified in the measurement contents; and
    executing the downlink measurement according to the guidance signal at the subscriber equipment to acquire the downlink measurement results including a signal to interference plus noise ratio (SINR).

6. The method according to claim 3, further comprising:
    negotiating the guidance signal used in the downlink measurement with the relay station facilitating the route change and using the guidance signal determined by negotiation as the predetermined guidance signal at the base station before the transmission of the predetermined guidance signal to the subscriber equipment over the downlink.

7. The method according to claim 1, further comprising transmitting a data sequence over the downlink from the base station and/or the relay station before the subscriber equipment executes the downlink measurement according to the received measurement contents.

8. The method according to claim 7, wherein further comprising negotiating a resource allocation scheme with the relay station facilitating the route change, at the base station before informing the subscriber equipment of the negotiated downlink measurement contents at the network side equipment; and
    using wireless resources according to the negotiated resource allocation scheme at the base station and/or the relay station facilitating the route change before the base station and/or the relay station facilitating the route change transmits the data sequence over the downlink.

9. The method according to claim 7, wherein the executing the downlink measurement by the subscriber equipment according to the received measurement contents comprises:
    receiving the data sequence over the downlink according to a frequency band and a time slot specified in the measurement contents and executing the downlink measurement according to the data sequence at the subscriber equipment to acquire the downlink measurement results including a radio frequency (RF) signal intensity.

10. The method according to claim 3, wherein the executing the route change for the subscriber equipment according to the received downlink measurement results at the radio access point comprises:
    determining whether a radio access point meeting the communication requirements of the subscriber equipment requesting the route change exists in the cell according to the received measurement results;
    executing an intracell route change for the subscriber equipment requesting the route change by changing the wireless resources used by the subscriber equipment and selecting a radio access point meeting the communication requirements to serve the subscriber equipment when it is determined that a radio access point meeting the communication requirements requesting the route change exists in the cell; and
    executing an intercell handover for the subscriber equipment requesting the route change when it is determined that a radio access point meeting the communication requirements requesting the route change does not exist in the cell.

11. The method according to claim 7, wherein the executing the route change for the subscriber equipment according to the received downlink measurement results at the radio access point comprises:
   determining whether a radio access point meeting the communication requirements of the subscriber equipment requesting the route change exists in the cell according to the received measurement results;
   executing an intracell route change for the subscriber equipment requesting the route change by changing the wireless resources used by the subscriber equipment and selecting a radio access point meeting the communication requirements to serve the subscriber equipment when it is determined that a radio access point meeting the communication requirements requesting the route change exists in the cell; and
   executing an intercell handover for the subscriber equipment requesting the route change when it is determined that a radio access point meeting the communication requirements requesting the route change does not exist in the cell.

12. The method according to claim 4, wherein the executing the route change by the radio access point for the subscriber equipment according to the received downlink measurement results comprises:
   determining whether a radio access point meeting the communication requirements of the subscriber equipment requesting a change of route exists in the cell according to the received measurement results;
   executing an intracell route change for the subscriber equipment requesting the route change by changing the attribution of the wireless resources currently used by the subscriber equipment and selecting the radio access point meeting the communication requirements to serve the subscriber equipment when it is determined that a radio access point meeting the communication requirements requesting the route change exists in the cell; and
   executing an intercell handover for the subscriber equipment requesting the route change when it is determined that the radio access point meeting the communication requirements requesting the route change does not exist in the cell.

13. The method according to claim 8, wherein the executing the route change by the radio access point for the subscriber equipment according to the received downlink measurement comprises:
   determining whether a radio access point meeting the communication requirements of the subscriber equipment requesting a change of route exists in the cell according to the received measurement results;
   executing an intracell route change for the subscriber equipment requesting the route change by changing the attribution of the wireless resources currently used by the subscriber equipment and selecting the radio access point meeting the communication requirements to serve the subscriber equipment when it is determined that the radio access point meeting the communication requirements requesting the route change exists in the cell; and
   executing an intercell handover for the subscriber equipment requesting the route change when it is determined that a radio access point meeting the communication requirements requesting the route change does not exist in the cell.

14. The method according to claim 1, further comprising negotiating a simulation scheme with the relay station facilitating the route change at the base station and simulating the base station according to the negotiated simulation scheme by periodically using the downlink to transmit a preamble sequence, a frame control header and a physical-layer mapping information frame in the simulation scheme at the relay station before the subscriber equipment executes the downlink measurements according to the received measurement contents.

15. The method according to claim 14, wherein the process of simulating the base station comprises simulating one base station by each relay station in the set of radio access points facilitating the route change or simulating one base station by two or more relay stations together.

16. The method according to claim 14, wherein the executing the downlink measurement by the subscriber equipment according to the received measurement contents comprises: receiving the preamble sequence, frame control header and physical-layer mapping information frame over the downlink according to the frequency band and time slot specified in the measurement contents and executing the downlink measurement according to the received signal at the subscriber equipment to acquire the downlink measurement results including a signal to interference plus noise ratio (SINR).

17. The method according to claim 14, further comprising stopping simulating the base station at the relay station facilitating the route change after the downlink measurement results are reported to the radio access point.

18. The method according to claim 14, wherein the executing the route change for the subscriber equipment according to the received downlink measurement results at the radio access point comprises:
   determining whether a simulated base station meeting the communication requirements of the subscriber equipment requesting a change of route exists in the cell according to the received measurement results;
   executing an intracell route change by allocating the wireless resources of the simulated base station meeting the communication requirements to the subscriber equipment when it is determined that the simulated base station meeting the communication requirements exists in the cell; and
   executing an intercell handover for the subscriber equipment requesting the route change when it is determined that a simulated base station meeting the communication requirements does not exist in the cell.

19. The method according to claim 1, wherein the informing the subscriber equipment requesting the route change of the negotiated downlink measurement contents comprises carrying the downlink measurement contents in a route change request message and transmitting the route change request message to the subscriber equipment, and wherein the reporting the downlink measurement results to the radio access point comprises carrying the downlink measurement results in a route change response message and transmitting the route change response message to the radio access point.

20. The method according to claim 19, wherein the carrying the downlink measurement contents in the route change request message and transmitting the route change request message to the subscriber equipment comprises transmitting a report-request (REP-REQ) command carrying the downlink measurement contents to the subscriber equipment, and
   wherein the carrying the downlink measurement results in the route change response message and transmitting the route change response message to the radio access point comprises transmitting a report-respond (REP-RSP) command carrying the downlink measurement results to the radio access point.

21. The method according to claim 19, wherein the carrying the downlink measurement contents in the route change request message and transmitting the route change request message to the subscriber equipment comprises allocating a channel quality information channel (CQICH) to carry channel quality information to the subscriber equipment requesting the route change and transmitting the downlink measurement contents to the subscriber equipment by carrying an information element defined by the CQICH, and     wherein the carrying the downlink measurement results in the route change response message and transmitting the route change response message to the radio access point comprises transmitting the downlink measurement results to the radio access point over the CQICH.

22. The method according to claim 19, wherein the carrying the downlink measurement contents in the route change request message and transmitting the route change request message to the subscriber equipment comprises transmitting a base station handover request (MOB_BSHO-REQ) command carrying the downlink measurement contents to the subscriber equipment, and     wherein the carrying the downlink measurement results in the route change response message and transmitting the route change response message to the radio access point comprises transmitting a handover indication (MOB_HO-IND) command carrying the downlink measurement results to the radio access point.

23. The method according to claim 1, further comprising executing an uplink measurement on the subscriber equipment by the radio access point and combining the uplink measurement results and the downlink measurement results before the radio access point having received the downlink measurement results executes the route change on the subscriber equipment.

24. The method according to claim 1, wherein the radio access point is a base station or one or more relay stations facilitating the route change.

25. The method according to claim 2, wherein the forming the set of radio access points facilitating the route change comprises determining elements in the set of radio access points by the base station by using a network topology structure and information regarding a current routing of the subscriber equipment requesting the route change.

26. The method according to claim 25, further comprising excluding from the set of radio access points any radio access point that has wireless resources not meeting the communication requirements of the subscriber equipment before the determining the elements in the set of radio access points or the executing the route change.

27. The method according to claim 1, wherein the network side equipment is a base station or a relay station.

\* \* \* \* \*